US012734876B2

(12) United States Patent
Schilder et al.

(10) Patent No.: US 12,734,876 B2
(45) Date of Patent: Sep. 15, 2026

(54) HYBRID DRIVE SYSTEM FOR A MOTOR VEHICLE, AND A MOTOR VEHICLE, IN PARTICULAR A MOTOR CAR

(71) Applicant: MERCEDES-BENZ GROUP AG, Stuttgart (DE)

(72) Inventors: Tobias Schilder, Ludwigsburg (DE); Klaus Riedl, Tübingen (DE); Joerg Mueller, Chemnitz (DE); Rico Resch, Chemnitz (DE); Martin Stoecker, Oelsnitz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 202 days.

(21) Appl. No.: 18/849,051

(22) PCT Filed: Mar. 3, 2023

(86) PCT No.: PCT/EP2023/055437
§ 371 (c)(1),
(2) Date: Sep. 20, 2024

(87) PCT Pub. No.: WO2023/180041
PCT Pub. Date: Sep. 28, 2023

(65) Prior Publication Data

US 2025/0236166 A1 Jul. 24, 2025

(30) Foreign Application Priority Data

Mar. 21, 2022 (DE) ..................... 10 2022 000 974.9

(51) Int. Cl.
*B60K 6/40* (2007.10)
*B60K 6/365* (2007.10)
(Continued)

(52) U.S. Cl.
CPC ................ *B60K 6/40* (2013.01); *B60K 6/365* (2013.01); *B60K 6/48* (2013.01); *B60K 6/547* (2013.01);
(Continued)

(58) Field of Classification Search
CPC . B60K 6/40; B60K 6/365; B60K 6/48; B60K 6/547; F16H 37/0806;
(Continued)

(56) References Cited

U.S. PATENT DOCUMENTS 12,030,384 B1 * 7/2024 Zeibig ...................... B60K 6/36
12,103,398 B2 * 10/2024 Gitt ........................ B60K 6/547
(Continued)

FOREIGN PATENT DOCUMENTS

DE 102015223026 A1 5/2017
DE 102016213737 A1 2/2018
(Continued)

OTHER PUBLICATIONS

International Search Report and Written Opinion mailed Apr. 11, 2023 in related/corresponding International Application No. PCT/EP2023/055437.
(Continued)

*Primary Examiner* — Jacob B Meyer
(74) *Attorney, Agent, or Firm* — PATENT PORTFOLIO BUILDERS PLLC

(57) ABSTRACT

A hybrid drive system for a motor vehicle has an internal combustion engine having a drive shaft via which first drive torques can be supplied by the internal combustion engine to drive the motor vehicle. The system also has an electric machine having a rotor via which second drive torques can be supplied by the electric machine to drive the motor vehicle. The system further has an axle drive having an axle drive input gear via which the axle drive can be driven and
(Continued)

Figure 1:
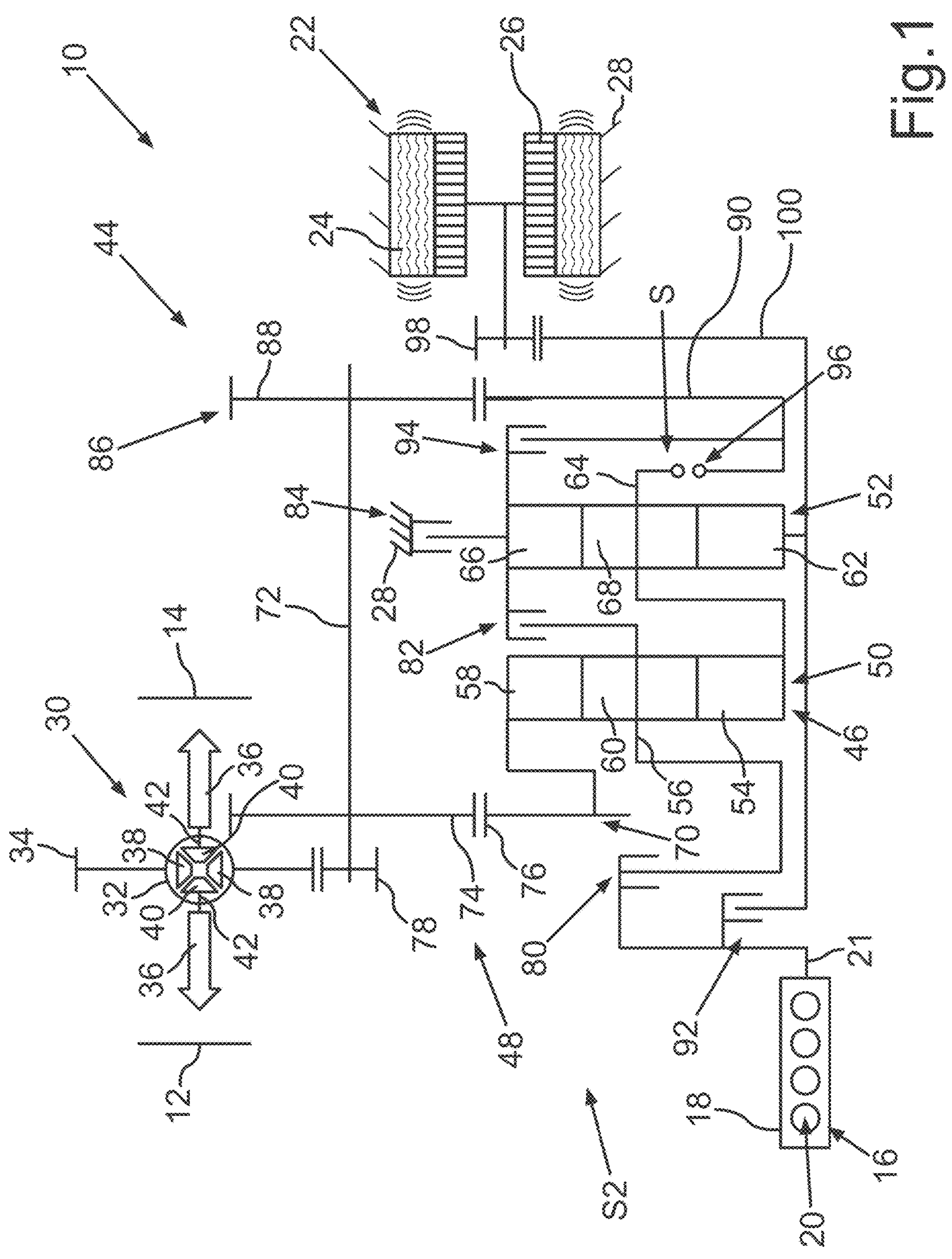

a gearbox having a first partial gearbox and a second partial gearbox. The first partial gearbox has a first planetary gear set having a first element, a second element, and a third element, as well as a second planetary gear set having a fourth element and a fifth element connected permanently in a rotationally fixed manner to the first element, and a sixth element.

9 Claims, 2 Drawing Sheets

(51) Int. Cl.
*B60K 6/48* (2007.10)
*B60K 6/547* (2007.10)
*F16H 37/08* (2006.01)

(52) U.S. Cl.
CPC ...... *F16H 37/0806* (2013.01); *B60Y 2200/92* (2013.01); *F16H 2200/2007* (2013.01); *F16H 2200/2043* (2013.01); *F16H 2200/2046* (2013.01)

(58) Field of Classification Search
CPC ..... F16H 2200/2007; F16H 2200/2043; F16H 2200/2046; B60Y 2200/92
See application file for complete search history.

(56) References Cited

U.S. PATENT DOCUMENTS 12,384,237 B1 * 8/2025 Schilder ................ B60K 6/365
2011/0124455 A1 * 5/2011 Borntraeger .......... B60K 6/365 475/5
2011/0263370 A1 * 10/2011 Borntraeger ........... F16H 3/725 903/910
2018/0134139 A1 * 5/2018 Beck ....................... B60K 6/48
2023/0076997 A1 * 3/2023 Bai ......................... B60K 6/365
2024/0308324 A1 * 9/2024 Gitt ......................... B60K 6/48
2025/0100368 A1 * 3/2025 Schilder ................ B60K 6/405
2025/0236166 A1 * 7/2025 Schilder ................ B60K 6/387

FOREIGN PATENT DOCUMENTS

DE 102017006082 A1 1/2019
DE 102018007154 A1 * 4/2019 ............ B60K 6/547
DE 102018006579 B3 * 10/2019 .............. B60K 6/48
JP 2004210116 A 7/2004
WO WO-2020002013 A1 * 1/2020 .......... F16H 37/042
WO WO-2023169871 A1 * 9/2023 ............ B60K 6/547
WO WO-2024046747 A1 * 3/2024 .............. B60K 6/48
WO WO-2024046749 A1 * 3/2024 .............. B60K 6/48

OTHER PUBLICATIONS

Office Action created Oct. 28, 2022 in related/corresponding DE Application No. 10 2022 000 974.9.

* cited by examiner 10
44
48
74
76
70
72
S
58
56
60
54
46
50
82
64
62
52
84
28
66
14
30
36
88
94
68
96
86
34
32
78
98
92
90
100
80
21
24
22
26
28
12
18
16
20
92
S2

HYBRID DRIVE SYSTEM FOR A MOTOR VEHICLE, AND A MOTOR VEHICLE, IN PARTICULAR A MOTOR CAR

BACKGROUND AND SUMMARY OF THE INVENTION

Exemplary embodiments of the invention relate to a hybrid drive system for a motor vehicle, in particular for a motor car, as well as to a motor vehicle having such a hybrid drive system.

DE 10 2017 006 082 A1 and DE 10 2016 213 737 A1 each disclose a hybrid drive device having an internal combustion engine and an electric machine having a rotor.

The generic DE 10 2015 223 026 A1 discloses, similarly to the aforementioned documents, a hybrid drive device having an internal combustion engine, an electric machine, and a gearbox with two partial gearboxes, wherein a first of the partial gearboxes has two planetary gear sets. In this case, spur gear stages of a second of the partial gearboxes are arranged axially on different sides of the first partial gearbox.

Exemplary embodiments of the present invention are directed to a hybrid drive system for a motor vehicle and a motor vehicle having such a hybrid drive system so that a particularly advantageous drive can be realized in a particularly space-efficient manner.

A first aspect of the invention relates to a hybrid drive system, designed and also referred to as a hybrid drive device or hybrid drive apparatus, for a motor vehicle, in particular for a motor car. This means that, when fully assembled, the motor vehicle in the form, in particular of a motor car, especially a passenger car, has the hybrid drive system and can be driven by means of the hybrid drive system. The hybrid drive system has an internal combustion engine, also referred to as a combustion engine, which has a drive shaft. For example, the internal combustion engine is designed as a reciprocating piston engine, so that especially the drive shaft can be designed as a crankshaft. The internal combustion engine can supply first drive torques via the drive shaft to drive the motor vehicle. The first drive torques are first torques for driving the motor vehicle.

The hybrid drive system further comprises an electric machine having a rotor. For example, the electric machine has a stator, by means of which the rotor can be driven and therefore can be rotated around a machine rotational axis, relative to the stator. The electric machine can supply second drive torques via the rotor to drive the motor vehicle. The second drive torques are second torques for driving the motor vehicle. For example, the motor vehicle, when fully assembled, has at least or exactly two vehicle axles, also simply referred to as axles, arranged successively and thus one behind the other in the vehicle longitudinal direction. The respective axle has at least or exactly two vehicle wheels, also simply referred to as wheels, which are arranged on sides opposite each other in the vehicle transverse direction of the motor vehicle, also referred to as a vehicle. The respective wheel is a ground contact element, via which the motor vehicle can be or is supported downwards on the ground, in the vertical direction of the vehicle. If the motor vehicle drives along the ground and in the process is driven by means of the hybrid drive system while the motor vehicle is supported downwards on the ground via the ground contact elements in the vertical direction of the vehicle, the ground contact elements roll, in particular directly, along the ground. For example, the hybrid drive system is assigned to, in particular, exactly one of the axles, so that the wheels of the axle to which the hybrid drive system are assigned can be driven, for example, by means of the hybrid drive system. Thus, in particular, it is conceivable that the internal combustion engine can drive via its drive shaft, and the electric machine can drive via its rotor, the same wheels of the axle to which the hybrid drive system is assigned. The motor vehicle can be driven by driving the wheels. The wheels, which can be driven by means of the hybrid drive system, i.e., by means of the internal combustion engine and by means of the electric machine, are also referred to as driven or drivable wheels or as drive wheels or as driven or drivable vehicle wheels. When the wheels or vehicle wheels are referred to in the following, unless otherwise stated, this means the wheels of the axle to which the hybrid drive system is assigned that can be driven by means of the hybrid drive system.

The hybrid drive system comprises an axle drive that, in particular, is assigned to the axle to which the hybrid drive system is assigned. In particular, the wheels can be driven via the axle drive by the internal combustion engine and the electric machine. Very particularly, the axle drive is a differential gearbox, also simply referred to as a differential, which, in particular, has the function well-known from the general prior art that a respective third torque can be distributed onto the wheels via the axle drive, such that the wheels can be driven via the axle drive by means of the respective third torque. For example, the respective third torque results from the respective first drive torque and/or from the respective second drive torque. In particular, the axle drive allows different speeds of the wheels during cornering of the motor vehicle for example, so that for example, the outside wheel can rotate at a greater speed than the inside wheel, in particular while the wheels can be or are driven via the axle drive by means of the third torque. The axle drive has an axle drive input gear via which the axle drive can be driven, in particular in such a way that the respective third torque can be introduced into the axle drive via the axle drive input gear or can be transmitted onto the axle drive. For example, the axle drive input gear is a first gear wheel of the hybrid drive system, i.e., it is also referred to as a first gear wheel of the hybrid drive system. For example, the axle drive input gear can be designed as a crown wheel. The axle drive can be designed as a bevel gear differential or also as a planetary gear differential. Particularly if the axle drive input gear is designed as a gear wheel, the axle drive input gear is also referred to as an axle drive input gear wheel.

Furthermore, the hybrid drive system has a gearbox, also referred to as a main gearbox and, in particular, provided in addition to the axle drive, the gearbox having a first partial gearbox and a second partial gearbox. In particular, it is conceivable that the axle drive can be driven via the gearbox by the internal combustion engine and by the electric machine, so that, for example, the gearbox can supply the respective third torque, or the gearbox can supply, for example, a respective fourth torque, from which, for example, the respective third torque results. In this case, it is conceivable that the respective fourth torque results from the respective first drive torque and/or from the respective second drive torque.

The first partial gearbox has a first planetary gear set, which is also simply referred to as a first planetary set. The first planetary gear set has a first sun gear, a first planetary carrier, which is also referred to as a first bridge, and a first ring gear. The first sun gear, the first planetary carrier, and the first ring gear are also referred to as planetary gear set elements of the first planetary gear set, i.e., the first sun gear, the first planetary carrier and the first ring gear are planetary gear set elements of the first planetary gear set. A first of the planetary gear set elements is also referred to as a first element, a second of the planetary gear set elements is also referred to as a second element, and the third planetary gear set element of the first planetary gear set is also referred to as a third element of the third planetary gear set.

Furthermore, the first partial gearbox has a second planetary gear set, in particular, provided in addition to the first planetary gear set, which is also simply referred to as a second planetary set. In particular, the second planetary gear set has a second sun gear, a second planetary carrier, which is also referred to as a second bridge, and a second ring gear. The second sun gear, the second planetary carrier, and the second ring gear are also referred to as gear elements of the second planetary gear set, i.e., they are gear elements of the second planetary gear set. A first of the gear elements is also referred to as a fourth element, a second of the gear elements is also referred to as a fifth element, and the third gear element is also referred to as a sixth element of the second planetary gear set. When the elements are referred to in the following, unless otherwise stated, this means the aforementioned six elements of the planetary gear set, namely the first element, the second element, the third element, the fourth element, the fifth element, and the sixth element.

In particular, it is conceivable that the hybrid drive system has a housing, with it being conceivable that the first planetary gear set and/or the second planetary gear set are each arranged at least partially, in particular at least predominantly and thus at least more than half or completely, in the housing. For example, if the respective planetary gear set element is not connected in a rotationally fixed manner to the housing, the respective planetary gear set element can, in particular by driving the first planetary gear set, be rotated around a first planetary gear set rotational axis of the first planetary gear set, relative to the housing. Furthermore, it is conceivable that if the respective gear element is not connected in a rotationally fixed manner to the housing, the respective gear element can, in particular by driving the second planetary gear set, be rotated around a second planetary gear set rotational axis of the second planetary gear set, relative to the housing. In particular, it can be provided that the planetary gear sets are arranged coaxially to each other so that the planetary gear set rotational axes coincide.

With the hybrid drive system, it is provided that the fifth element is connected permanently in a rotationally fixed manner to the first element or vice versa.

The second partial gearbox has a first spur gear stage, a second spur gear stage, provided in particular in addition to the first spur gear stage, as well as an output drive shaft, provided in particular in addition to the drive shaft. The spur gear stage comprises, for example, in particular exactly two gear wheels, designed in particular as spur gears, specifically a second gear wheel and a third gear wheel. In particular, it is conceivable that the gear wheels of the spur gear stage mesh, in particular directly and/or permanently, with each other. The feature that two gear wheels, such as the second gear wheel and the third gear wheel, mesh permanently with each other, i.e., are permanently engaged with each other, means that the gear wheels permanently meshing with each other cannot be moved relative to each other between a meshed position, in which the gear wheels mesh with each other, and a released position, in which the gear wheels do not mesh with each other, but the gear wheels permanently meshing with each other are permanently, i.e., always, engaged with each other.

The first spur gear stage has a first output gear wheel which is, for example, the aforementioned second gear wheel of the first spur gear stage. The first output gear wheel is arranged coaxially to the output drive shaft. In particular, the output gear wheel, for example, can be arranged on the output drive shaft. In particular, it is conceivable that the first output gear wheel is connected, in particular permanently, in a rotationally fixed manner to the output drive shaft. The first output gear wheel meshes, in particular permanently, with a first input gear wheel of the first spur gear stage, wherein the first input gear wheel of the first spur gear stage is, for example, the aforementioned third gear wheel. The first input gear wheel is or can be connected in a rotationally fixed manner to the third element.

The second spur gear stage has a second output gear wheel, which is arranged coaxially to the output drive shaft. In particular, the second output gear wheel, for example, can be arranged on the output drive shaft. In particular, it is conceivable that the second output gear wheel is connected, in particular permanently, in a rotationally fixed manner to the output drive shaft. In particular, the second output gear wheel is a fourth gear wheel of the hybrid drive system, wherein the fourth gear wheel is designed in particular as a spur gear. The second output gear wheel meshes, in particular permanently, with a second input gear wheel of the second spur gear stage. In particular, the second input gear wheel is a fifth gear wheel of the hybrid drive system, wherein the fifth gear wheel or the second input gear wheel is in particular a spur gear. The second input gear wheel is or can be connected in a rotationally fixed manner to the sixth element.

Furthermore, it is provided that the rotor of the electric machine is or can be coupled, i.e., is or can be connected, in particular in a torque-transmitting and very particularly in a rotationally fixed manner, to the fourth element in such a way that the respective second drive torque that is or can be supplied by the electric machine via the rotor can be introduced at the fourth element into the gearbox, i.e., the respective second drive torque that is or can be supplied by the electric machine via the rotor can be transmitted from the rotor onto the fourth element and thus can be introduced via the fourth element into the gearbox, in particular in order to thereby drive the gearbox.

Furthermore, the hybrid drive system comprises an output drive gear wheel which is, for example, a sixth gear wheel of the hybrid drive system. In particular, the second gear wheel is provided in addition to the first gear wheel, the third gear wheel in addition to the first and second gear wheel, the fourth gear wheel in addition to the first, second and third gear wheel, the fifth gear wheel in addition to the first, second, third and fourth gear wheel, and the sixth gear wheel in addition to the first, second, third, fourth and fifth gear wheel. The output drive gear wheel is connected permanently in a rotationally fixed manner to the output drive shaft. Furthermore, it is provided that the output drive gear wheel meshes permanently with the axle drive input gear. For example, the output drive gear wheel can be designed as a bevel gear. In particular, it is provided that the second output gear wheel is arranged coaxially to the first output gear wheel. Furthermore, it is conceivable that the output drive gear wheel is arranged coaxially to the first output gear wheel and coaxially to the second output gear wheel.

In the context of the present disclosure, the feature that two components, such as the third element and the input gear wheel or the output drive gear wheel and the output drive shaft, are connected to each other in a rotationally fixed manner, is to be understood as meaning that the components connected to each other in a rotationally fixed manner are arranged coaxially to each other and, particularly when the components are driven, rotate together or simultaneously around a component rotational axis common to the components, for example the first planetary gear set rotational axis and/or the second planetary gear set rotational axis, with the same angular velocity, in particular relative to the housing. The feature that two components, such as the rotor and the fourth element, for example, are coupled or connected to each other in a torque-transmitting manner means that the components are coupled or connected to each other in such a way that torques can be transmitted between the components, whereby if the components are connected to each other in a rotationally fixed manner, the components are also connected to each other in a torque-transmitting manner.

The feature that two components are permanently connected to each other in a torque-transmitting manner means that rather than a switching element, for instance, being provided which can be switched between a coupled state connecting the components to each other in a torque-transmitting manner and a decoupled state in which no torques can be transmitted between the components, instead the components are constantly or always and thus permanently connected to each other in a torque-transmitting manner, i.e., in such a way that a torque can be transmitted between the components. This means, for example, that one of the components can be driven by the respective other component or vice versa. For example, the rotor is coupled, i.e., connected, to the fourth element permanently in a torque-transmitting, in particular rotationally fixed, manner. In particular, the feature that two components, such as the drive gear wheel and the output drive shaft, are permanently connected to each other in a rotationally fixed manner means that rather than a switching element, for instance, being provided that can be switched between a coupled state connecting the components to each other in a rotationally fixed manner and a decoupled state in which the components are decoupled from each other and rotatable relative to each other, in particular about the component axis of rotation, so that for example no torques can be transmitted between components, instead the components are constantly or always and thus permanently connected or coupled to each other in a rotationally fixed manner. Thus, in the context of the present disclosure, a rotationally fixed connection of two elements, in particular two rotatably mounted elements, means that these two elements are arranged coaxially to each other and are connected to each other in such a way that they rotate at the same angular velocity. Furthermore, the feature that two components, such as the rotor of the electric machine and the fourth element, can be coupled or connected to each other in a torque-transmitting, in particular rotationally fixed, manner means that a switching element also referred to as a switch element is assigned to the components, which can be switched between a coupled state, in which the components are connected to each other in a torque-transmitting, in particular rotationally fixed, manner by means of the switching element, and a decoupled state, in which the components are decoupled from each other, so that the components can rotate relative to each other, in particular around the component rotational axis, and so that, in particular, no torques can be transmitted between the components.

The hybrid drive system has a first switching element designed to connect the drive shaft of the internal combustion engine in a rotationally fixed manner to the second element. In other words, it is provided that the drive shaft can be connected in a rotationally fixed manner to the second element by means of the first switching element. Thus, the first switching unit can be switched, for example, between a first coupled state and a first decoupled state. In the first coupled state, the drive shaft is connected in a rotationally fixed manner to the second element by means of the first switching element, such that the drive shaft and the second element rotate or can rotate together or simultaneously and in particular at the same angular velocity, particular around the first planetary gear set rotational axis and relative to the housing, in particularly when, for example, the drive shaft drives the second element or vice versa. In the first decoupled state, the second switching element allows relative rotations between the drive shaft and the second element, in particular around the first planetary gear set rotational axis. In particular, the drive shaft can be rotated around a drive shaft rotational axis relative to the housing. Very preferably, the drive shaft is arranged coaxially to the first planetary gear set and/or coaxially to the second planetary gear set, so that preferably the drive shaft rotational axis coincides with the first planetary gear set rotational axis and/or with the second planetary gear set rotational axis. For example, the first switching element can be moved, in particular translationally and/or relative to the housing, between at least one first coupled position, which brings about the first coupled state, and at least one first decoupled position, which brings about the first decoupled state.

Furthermore, the hybrid drive system comprises a second switching element, which is designed to connect the second element in a rotationally fixed manner to the sixth element. In other words, the second element can be connected in a rotationally fixed manner to the sixth element by means of the second switching element or vice versa. Thus, in particular, the second switching element can be switched between a second coupled state and a second decoupled state. In the second coupled state, the second element and the sixth element are connected to each other in a rotationally fixed manner by means of the second switching element, so that the second element and the sixth element rotate or can rotate together or simultaneously, i.e., at the same angular velocity, in particular around the first planetary gear set rotational axis or the second planetary gear set rotational axis and/or relative to the housing, particularly when the first or second partial gearbox is driven. In the second decoupled state, the second switching element allows relative rotations between the second element and the sixth element, in particular around the first and/or second planetary gear set rotational axis, so that in the second decoupled state, the second element and the sixth element can rotate relative to each other, in particular around the first or second planetary gear set rotational axis. For example, the second switching element can be moved, in particular translationally and/or relative to the housing, between at least one second coupled position, which brings about the second coupled state, and at least one second decoupled position, which brings about the second decoupled state.

In order to be able to realize a particularly advantageous drive in a particularly space-efficient manner, it is provided in a known manner that the second spur gear stage is arranged on a side of the first partial gearbox facing away from the first spur gear stage when viewed in the axial direction. In the context of the present disclosure, the terms “axial” and “coaxial” refer to the respective planetary gear set rotational axis, unless otherwise specified. In this case, however, the feature that the respective output gear wheel is arranged coaxially to the output drive shaft means that the respective output gear wheel and the output drive shaft can be rotated around a common output drive shaft rotational axis, in particular relative to the housing, whereby particularly when the respective output gear wheel is connected, in particular permanently, in a rotationally fixed manner to the output drive shaft, the output drive shaft and the respective output gear wheel rotate or can rotate together or simultaneously and at the same angular velocity around the output drive shaft rotational axis, relative to the housing.

Thus, it is provided that the second spur gear stage is arranged on a side of the first partial gearbox facing away from the first spur gear stage when viewed in the axial direction and thus along the respective planetary gear set rotational axis. In other words, the second spur gear stage is arranged on a side of the first partial gearbox facing away from the spur gear stage, i.e., pointing away from the first spur gear stage, when viewed in the axial direction of the respective planetary gear set and thus along the respective planetary gear set rotational axis, in particular in such a way that the second spur gear stage is overlapped at least partially, in particular at least predominantly and thus at least more than half or completely, by the first partial gearbox and thus by the first planetary gear set and/or by the second planetary gear set in a direction extending parallel to the respective planetary gear set rotational axis or coinciding with the respective planetary gear set rotational axis and pointing from the second spur gear stage towards the first spur gear stage. Therefore, a particularly compact and thus space-efficient construction of the hybrid drive system can be realized. Furthermore, a particularly advantageous multi-gear capability and thus switchability of the gearbox can be achieved so that a particularly good drivability and thus a particularly good drive of the motor vehicle can be achieved.

In the scope of the present disclosure, ordinal numbers also referred to as ordinals, such as for example "first," "second" etc., are not necessarily used in order to specify or imply a number or amount, but to be able to make clear reference to terms which are assigned the ordinal numbers or to which the ordinal numbers refer.

In order to be able to achieve a particularly good multi-gear capability and thus a particularly advantageous drive, it is provided according to the invention that the hybrid drive system has a sixth switching element designed to connect the second input gear wheel in a rotationally fixed manner to the fifth element. In other words, the second input gear wheel can be connected in a rotationally fixed manner to the fifth element by means of the sixth switching element or vice versa. For example, the sixth switching element can be switched between a sixth coupled state and a sixth decoupled state. In the sixth coupled state, the second input gear wheel is connected in a rotationally fixed manner to the fifth element by means of the sixth switching element. In the sixth decoupled state, the sixth switching element allows relative rotations between the second input gear wheel and the fifth element, in particular around the second planetary gear set rotational axis. For example, the sixth switching element can be moved, in particular translationally and/or relative to the housing, between at least one sixth coupled position, which brings about the sixth coupled state, and at least one sixth decoupled position, which brings about the sixth decoupled state.

In order to be able to keep the installation space requirement, the costs, and the weight of the hybrid drive system particularly low, it is provided in an embodiment of the invention that in total exactly two planetary gear sets are provided, specifically the first planetary gear set and the second planetary gear set. In other words, it is preferably provided that the hybrid drive system has in total exactly, i.e., exclusively, two planetary gear sets, specifically the first planetary gear set and the second planetary gear set.

A further embodiment is characterized by a third switching element designed to connect the sixth element in a rotationally fixed manner to a housing of the hybrid drive system. In other words, the sixth element can be connected in a rotationally fixed manner to the housing by means of the third switching element. The third switching element can thus be switched between a third coupled state and a third decoupled state, for example. In the third coupled state, the sixth element is connected in a rotationally fixed manner to the housing by means of the third switching element, so that the sixth element cannot rotate around the second planetary gear set rotational axis relative to the housing, in particular not even when the second planetary gear set is driven. In the third decoupled state, the third switching element allows relative rotations between the sixth element and the housing, in particular around the second planetary gear set rotational axis, so that the sixth element can be rotated around the second planetary gear set rotational axis relative to the housing. For example, the third switching element can be moved, in particular translationally and/or relative to the housing, between at least one third coupled position, which brings about the third coupled state, and at least one third decoupled position, which brings about the third decoupled state. By using the third switching element, a particularly advantageous switchability and thus drivability can be achieved.

In order to be able to realize a particularly good multi-gear capability and thus switchability and drivability, it is provided in a further embodiment of the invention that the hybrid drive system has a fourth switching element designed to connect the drive shaft in a rotationally fixed manner to the fourth element. In other words, it is preferably provided that the drive shaft can be connected in a rotationally fixed manner to the fourth element by means of the fourth switching element. In particular, the fourth switching element can be switched between a fourth coupled state and a fourth decoupled state. In the fourth coupled state, the drive shaft is connected in a rotationally fixed manner to the fourth element by means of the fourth switching element, so that the drive shaft and the fourth element rotate or can rotate together or simultaneously, in particular around the second planetary gear set rotational axis and/or relative to the housing, particularly when the drive shaft drives the fourth element or vice versa. In the fourth decoupled state, the fourth switching element allows relative rotations between the drive shaft and the fourth element, in particular around the second planetary gear set rotational axis. For example, the fourth switching element can be moved, in particular translationally and/or relative to the housing, between at least one fourth coupled position, which brings about the fourth coupled state, and at least one fourth decoupled position, which brings about the fourth decoupled state.

In a particularly advantageous embodiment of the invention, the hybrid drive system comprises a fifth switching element designed to connect the sixth element in a rotationally fixed manner to the second input gear wheel. In other words, the sixth element can be connected in a rotationally fixed manner to the second input gear wheel by means of the sixth switching element or vice versa. As a result, a particularly advantageous multi-switchability and thus multi-gear capability of the gearbox can be realized so that a particularly good drivability and a particularly good drive can be achieved. For example, the fifth switching element can be switched between a fifth coupled state and a fifth decoupled state. In the fifth coupled state, the sixth element is connected in a rotationally fixed manner to the second input gear wheel by means of the fifth switching element. In the fifth decoupled state, the fifth switching element allows relative rotations between the sixth element and the second input gear wheel, in particular around the second planetary gear set rotational axis. For example, the fifth switching element can be moved, in particular translationally and/or relative to the housing, between at least one fifth coupled position, which brings about the fifth coupled state, and at least one fifth decoupled position, which brings about the fifth decoupled state.

In order to keep the installation space requirement of the hybrid drive system particularly low when viewed in the axial direction and thus along the respective planetary gear set rotational axis, it is provided in a further embodiment of the invention that a rotor wheel of the electric machine, the second spur gear stage, the first partial gearbox, and the first spur gear stage, when viewed or extending in an axial direction, i.e., along the respective planetary gear set rotational axis, are arranged in the mentioned order, i.e., in succession and thus one after another in the following order: the rotor wheel—the second spur gear stage—the first partial gearbox—the first spur gear stage. Thus, it is preferably provided that, when viewed in the axial direction of the respective planetary gear set and thus along the respective planetary gear set rotational axis, the second spur gear stage adjoins the rotor wheel, the first partial gearbox adjoins the second spur gear stage, and the first spur gear stage adjoins the first partial gearbox.

For example, the rotor wheel is a seventh gear wheel of the hybrid drive system, wherein the seventh gear wheel can be designed as a spur gear. For example, the rotor wheel can thus be rotated around the machine rotational axis relative to the housing. In particular it is conceivable that the rotor can supply the respective second drive torque via the rotor wheel.

The hybrid drive system comprises, for example, an additional, eighth gear wheel, which can be designed as a spur gear. In particular, the seventh gear wheel is provided in addition to the first, second, third, fourth, fifth, and sixth gear wheel, and preferably the eighth gear wheel is provided in addition to the first, second, third, fourth, fifth, sixth, and seventh gear wheel. For example, it is conceivable that the rotor wheel meshes, in particular permanently, with the eighth gear wheel. For example, the eighth gear wheel is or can be connected to the fourth element in a torque-transmitting, in particular rotationally fixed, manner. In particular it is conceivable that the eighth gear wheel is connected to the fourth element permanently in a torque-transmitting, in particular rotationally fixed, manner.

Preferably it is provided that the first element is the sun gear, the second element is the first planetary carrier, and the third element is the first ring gear. Alternatively, or additionally, for example, the fourth element is the second sun gear, the fifth element is the second planetary carrier, and the sixth element is the second ring gear.

In order to be able to realize a particularly advantageous drive in a particularly space-efficient manner, it is provided in a further embodiment of the invention that the drive shaft and thus the internal combustion engine is arranged coaxially to the first partial gearbox and thus coaxially to the first planetary gear set and coaxially to the second planetary gear set. In this case, it is preferably provided that the output drive gear wheel is arranged axially between the internal combustion engine and the first partial gearbox, i.e., when viewed in the axial direction and thus along the respective planetary gear set rotational axis. In particular, this is understood as meaning that the output drive gear wheel is arranged in a plane extending perpendicular to the axial direction of the respective planetary gear set and thus perpendicular to the respective planetary gear set rotational axis, which plane is arranged between the internal combustion engine and the first partial gearbox, when viewed in an axial direction and thus along the respective planetary gear set rotational axis.

For example, the fourth switching element and/or the first switching element are arranged axially overlapping the output drive gear wheel. Furthermore, it is conceivable that the fourth switching element and/or the first switching element are arranged axially overlapping the electric machine, in particular the rotor and/or the stator. "Axially overlapping" is understood to mean, in particular, the following: two elements, such as the fourth switching element and the electric machine, are arranged axially overlapping when they are arranged in regions of identical axial coordinates. There is thus at least one straight line, arranged radially, i.e., extending in a radial direction of the respective planetary gear set and thus perpendicular to the respective planetary gear set rotational axis, which penetrates or intersects both the one and the other of the elements arranged axially overlapping.

A second aspect of the invention relates to a motor vehicle, also simply referred to as a vehicle, which, for example, can be a motor car, in particular a passenger car. The motor vehicle has a hybrid drive system according to the first aspect of the invention. The motor vehicle can be driven by means of the hybrid drive system. Advantages and advantageous embodiments of the first aspect of the invention are to be regarded as advantages and advantageous embodiments of the second aspect of the invention and vice versa.

With the invention, the hybrid drive system, in particular the gearbox, can be designed as a particularly advantageous multi-stage gearbox, based on coupled planetary gear sets in the form of the first planetary gear set and the second planetary gear set, in particular in an axially parallel design, wherein the power loss can be kept particularly low. In particular it is possible to realize up to eight hybrid or internal combustion engine forward gears and one hybrid reverse gear. Furthermore, at least four electric gears and various stepless driving ranges can be achieved. A large spread can be achieved. At least one of the switching elements can be designed as a form-fit switching element, in particular as a claw coupling, in particular with or without a synchronization unit, in order to keep losses particularly low.

In order to keep the costs particularly low, preferably the planetary gear sets are designed as simple planetary gear sets. Very good efficiency can be realized. The electric machine can be arranged coaxially or axially parallel. The coaxial arrangement of the electric machine is, in particular, understood to mean that the machine rotational axis coincides with the planetary gear set rotational axis, i.e., the electric machine or the rotor is arranged coaxially to the respective planetary gear set. The axially parallel arrangement of the electric machine is understood to mean that the machine rotational axis extends parallel to the respective planetary gear set rotational axis and is spaced apart from the respective planetary gear set rotational axis. Further claw switching elements can be realized, in particular by using the electric machine.

Further advantages, features and details of the invention can be seen from the following description of preferred exemplary embodiments and from the drawings. The features and combinations of features mentioned above in the description as well as the features and combinations of features mentioned below in the description of the figures and/or shown alone in the figures can be used not only in the combination indicated in each case, but also in other combinations or on their own, without leaving the scope of the invention.

BRIEF DESCRIPTION OF THE DRAWING FIGURES

Figure 2:
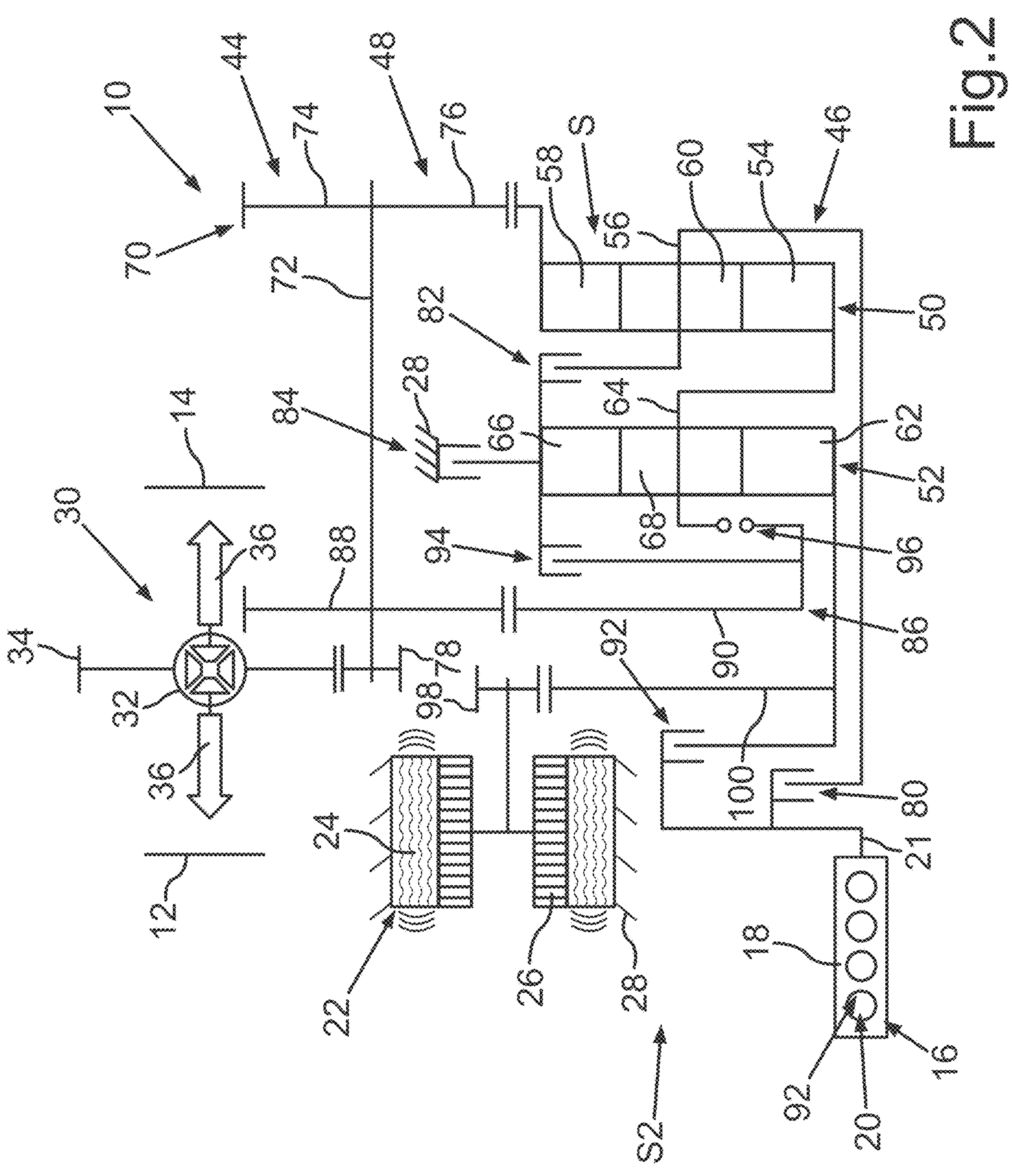

The drawing shows in:

FIG. 1 a schematic representation of a first embodiment of a hybrid drive system for a motor vehicle; and FIG. 2 a schematic representation of a second embodiment of the hybrid drive system.

In the figures, identical or functionally identical elements are provided with the same reference signs.

DETAILED DESCRIPTION

FIG. 1 shows a schematic representation of a first embodiment of a hybrid drive system 10 for a motor vehicle, also referred to as a vehicle. The motor vehicle is preferably a motor car. The motor vehicle has, for example, at least or exactly two vehicle axles arranged one behind the other in the vehicle longitudinal direction. The respective vehicle axle is also simply referred to as an axle and has at least or exactly two vehicle axles, wherein the vehicle wheels are ground contact elements of the motor vehicle. The hybrid drive system 10 is assigned to one, in particular to exactly one, of the axles, so that the vehicle wheels of the vehicle axle to which the hybrid drive system 10 is assigned can be driven by means of the hybrid drive system 10. The vehicle wheels, able to be driven by means of the hybrid drive system 10, of the vehicle axle to which the hybrid drive system 10 is assigned are represented particularly schematically in FIG. 1 and are labelled 12 and 14.

The hybrid drive system 10 has an internal combustion engine 16, which is also referred to as an internal combustion machine, motor, or combustion engine. The internal combustion engine 16 has a cylinder housing 18, also referred to as an engine block, which has multiple cylinders 20. In fueled operation of the internal combustion engine, combustion processes take place in the cylinders 20. For example, the internal combustion engine 16 is designed as a reciprocating piston engine. The internal combustion engine 16 has a drive shaft 21, designed, for example, as a crankshaft, which can be rotated around a drive shaft rotational axis relative to the cylinder housing 18. The internal combustion engine 16 can supply first drive torques via the drive shaft 21 to drive the vehicle wheels 12 and 14 and thus to drive the motor vehicle.

The hybrid drive system 10 furthermore comprises an electric machine 22, which has a stator 24 and a rotor 26. The rotor 26 can be driven by means of the stator 24 and thus can be rotated around a machine rotational axis relative to the stator 24. Furthermore, the hybrid drive system 10 comprises a housing 28 represented particularly schematically in FIG. 1, wherein the drive shaft 21 can be rotated around the drive shaft rotational axis and the rotor 26 can be rotated around the machine rotational axis relative to the housing 28. The electric machine 22 can supply second drive torques via the rotor 26 to drive the vehicle wheels 12 and 14 and thus to drive the motor vehicle.

Furthermore, the hybrid drive system 10 has an axle drive 30, designed as a differential gearbox and also simply referred to as a differential, via which the vehicle wheels 12 and 14 can be driven by the electric machine 22 and by the internal combustion engine 16. In the first embodiment, the axle drive 30 is designed, for example, as a bevel gear differential. The axle drive 30 has an axle drive housing 32 which is designed here, for example, as a so-called differential cage. Furthermore, the axle drive 30 has an axle drive input gear 34 which is connected, in particular permanently, in a rotationally fixed manner to the axle drive housing 32. Thus, the axle drive housing 32 and the axle drive input gear 34 can be rotated around an axle drive rotational axis relative to the housing 28. As illustrated in FIG. 1 by arrows 36, the axle drive 30 can distribute or transmit a respective third drive torque, also referred to as a third torque and resulting from the respective first drive torque and/or from the respective second drive torque, onto the vehicle wheels 12 and 14, whereby the vehicle wheels 12 and 14 can be driven. The axle drive 30 has pinion gears 38, designed here as bevel gears, which can be rotated with the axle drive housing 32 around the axle drive rotational axis relative to the housing 28. Furthermore, the pinion gears 38 can rotate around a pinion gear rotational axis, which extends perpendicular to the axle drive rotational axis. The pinion gears 38 mesh, in particular permanently, with side gears 40 of the axle drive 30. The respective pinion gear 38 can be rotated relative to the axle drive housing 32 around the pinion gear rotational axis, which extends perpendicular to the axle drive rotational axis. The respective side gear 40 can be rotated around the axle drive rotational axis relative to the housing 28 and also relative to the axle drive housing 32. The respective side gear 40 is connected, in particular permanently, in a rotationally fixed manner to a respective side shaft 42, whereby the respective vehicle wheel 12, 14 can be driven by the respective side shaft 42.

The hybrid drive system 10 furthermore comprises a gearbox 44, also referred to as a main gearbox, which has a first partial gearbox 46 and a second partial gearbox 48. The first partial gearbox 46 has a first planetary gear set 50 and a second planetary gear set 52, which are arranged in this case coaxially to each other. The first planetary gear set 50 has a first element 54 designed as a first sun gear, a second element 56 designed as a first planetary carrier, and a third element 58 designed as a first ring gear. Furthermore, the first planetary gear set 50 has first planetary gears 60 that are rotatably mounted on the second element 56 (first planetary carrier) and simultaneously mesh with the first element 54 (first sun gear) as well as with the third element 58 (first ring gear). The second planetary gear set 52 has a fourth element 62 designed as a second sun gear, a fifth element 64 designed as a second planetary carrier, and a sixth element 66 designed as a second ring gear. Furthermore, the planetary gear set 52 has second planetary gears 68 that are rotatably mounted on the fifth element 64 (second planetary carrier) and simultaneously mesh with the fourth element 62, designed as the second sun gear, as well as with the sixth element 66 (second ring gear). In the first embodiment, the first sun gear is the first element 54, the planetary carrier is the second element 56, and the first ring gear is the third element 58. Furthermore, the second sun gear is the fourth element 62, the second planetary carrier is the fifth element 64, and the second ring gear is the sixth element 66. The first element 54 (first sun gear) is permanently connected in a rotationally fixed manner to the fifth element 64 (second planetary carrier).

The second partial gearbox 48 has a first spur gear stage 70. Furthermore, the second partial gearbox 48 comprises an output drive shaft 72 that can be rotated around an output drive shaft rotational axis relative to the housing 28. Particularly when the respective element is not connected to the housing 28 in a rotationally fixed manner, the respective element can be rotated around a planetary gear set rotational axis, relative to the housing 28. The planetary gear set rotational axis is a planetary gear set rotational axis common to the planetary gear sets 50 and 52, since the planetary gear sets 50 and 52 are arranged coaxially to each other.

In the first embodiment, the internal combustion engine 16 or the drive shaft 21 is arranged coaxially to the planetary gear sets 50 and 52, so that the drive shaft rotational axis coincides with the planetary gear set rotational axis. The output drive shaft 72 is arranged axially parallel to the planetary gear sets 50 and 52 and axially parallel to the drive shaft 21, so that the output drive shaft rotational axis extends parallel to the planetary gear set rotational axis and parallel to the drive shaft rotational axis and is spaced apart from the planetary gear set rotational axis and from the drive shaft rotational axis. In the first embodiment, the internal combustion engine 16 or the drive shaft 21 is arranged coaxially to the planetary gear sets 50 and 52, so that the drive shaft rotational axis coincides with the planetary gear set rotational axis. The electric machine 22, i.e., its rotor 26, is arranged axially parallel to the output drive shaft 72, axially parallel to the planetary gear sets 50 and 52 and axially parallel to the internal combustion engine 16, so that the machine rotational axis extends parallel to the output drive shaft rotational axis, parallel to the planetary gear set rotational axis, and parallel to the drive shaft rotational axis and is spaced apart from the output drive shaft rotational axis, from the planetary gear set rotational axis and from the drive shaft rotational axis. In the present case, the rotational axis of the axle drive also runs parallel to the machine rotational axis, parallel to the output drive shaft rotational axis, parallel to the planetary gear set rotational axis and parallel to the drive shaft rotational axis and is spaced apart from these.

The first spur gear stage 70 has a first output gear wheel 74 arranged coaxially to the output drive shaft 72. In the first embodiment, the output gear wheel 74 is connected, in particular permanently, in a rotationally fixed manner to the output drive shaft 72. Furthermore, it is conceivable that the output gear wheel 74 is arranged on the output drive shaft 72. The first spur gear stage 70 furthermore comprises a first input gear wheel 76 which meshes, in particular permanently, with the first output gear wheel 74. In the first embodiment, the first input gear wheel 76 is connected, in particular permanently, in a rotationally fixed manner to the third element 58 (first ring gear).

Furthermore, the rotor 26 is coupled to the fourth element 62 (second sun gear), in particular permanently, in a torque-transmitting manner, in such a way that the respective second drive torque, supplied or able to be supplied by the electric machine 22 via its rotor 26, or a torque resulting therefrom can be introduced at the fourth element 62 (second sun gear) into the gearbox 44. The hybrid drive system 10 furthermore comprises an output drive gear wheel 78 connected permanently in a rotationally fixed manner to the output drive shaft 72 and thus is arranged coaxially to the output drive shaft 72 and also coaxially to the output gear wheel 74. The output drive gear wheel 78 meshes permanently with the axle drive input gear 34 of the axle drive 30, the axle drive input gear 34 of which can be, for example, a gear wheel, in particular a crown wheel.

The hybrid drive system 10 has a first switching element 80 by means of which the drive shaft 21 of the internal combustion engine 16 can be connected in a rotationally fixed manner to the second element 56 (first planetary carrier). Furthermore, the hybrid drive system 10 comprises a second switching element 82 by means of which the second element 56 (first planetary carrier) can be connected in a rotationally fixed manner to the sixth element 66 (second ring gear).

The hybrid drive system 10 has in total exactly two planetary gear sets, specifically the planetary gear sets 50 and 52.

The second partial gearbox 48 has a second spur gear stage 86 comprising a second output gear wheel 88. The second output gear wheel 88 is connected, in particular permanently, in a rotationally fixed manner to the output drive shaft 72. The spur gear stage 86 furthermore comprises a second input gear wheel 90 which meshes, in particular permanently, with the second output gear wheel 88. In the first embodiment, the second input gear wheel 90 can be connected in a rotationally fixed manner to the sixth element 66 (second ring gear). Furthermore, in the first embodiment, the second input gear wheel 90 can be connected in a rotationally fixed manner to the fifth element 64 (second planetary carrier).

In order to be able to realize a particularly advantageous drive in a particularly space-efficient manner, the second spur gear stage 86 is arranged on a side S of the partial gearbox 46 facing away from the first spur gear stage 70, i.e., pointing away from the first spur gear stage 70, when viewed in an axial direction and thus along the planetary gear set rotational axis, wherein in the first embodiment, the side S is a side of the second planetary gear set 52, in particular in that in a viewing direction extending parallel to the planetary gear set rotational axis or coinciding with the planetary gear set rotational axis and pointing away from the internal combustion engine 16, the planetary gear set 50 adjoins the internal combustion engine 16, the planetary gear set 52 adjoins the planetary gear set 50, and the spur gear stage 86 adjoins the planetary gear set 52, i.e., the planetary gear set 52 is arranged between the planetary gear set 50 and the spur gear stage 86. In other words, it is provided that the second spur gear stage 86 is arranged on the side S of the first partial gearbox 46 facing away, i.e., pointing away, from the first spur gear stage 70 in an axial direction of the respective planetary gear set 50, 52, wherein the axial direction of the respective planetary gear set coincides with the planetary gear set rotational axis.

The hybrid drive system 10 comprises a third switching element 84 by means of which the sixth element 66 (second ring gear) can be connected in a rotationally fixed manner to the housing 28. A fourth switching element 92 is also provided, by means of which the drive shaft 21 can be connected in a rotationally fixed manner to the fourth element (second sun gear 62). The hybrid drive system 10 furthermore comprises a fifth switching element 94 by means of which the second input gear wheel 90 can be connected in a rotationally fixed manner to the sixth element 66 (second ring gear) or vice versa. Furthermore, the hybrid drive system 10 comprises a sixth switching element 96 by means of which the second input gear wheel 90 can be connected in a rotationally fixed manner to the fifth element 6 (second planetary carrier) or vice versa.

In the first embodiment, the switching elements 80, 82, 84, 92, 96, and 94 are arranged in succession, i.e., one after another, when viewed in an axial direction of the respective planetary gear set 50, 52 and thus along the planetary gear set rotational axis, in the following order: the fourth switching element 92—the first switching element 80—the second switching element 82—the third switching element 84—the sixth switching element 96—the fifth switching element 94.

Furthermore, in the first embodiment, the electric machine 22 is arranged on the side S of the partial gearbox 46, also referred to as a first side. The internal combustion engine 16, however, is arranged on a second side S2 of the first partial gearbox 46, facing away from the electric machine 22 and the first side S when viewed in an axial direction of the respective planetary gear set 50, 52 and thus along the planetary gear set rotational axis, so that the planetary gear sets 50, 52, i.e., the first partial gearbox 46, is arranged between the internal combustion engine 16 of the electric machine 22, in the axial direction of the respective planetary gear set 50, 52. In the first embodiment, the second side S2 is a side of the planetary gear set 50, since the planetary gear set 50 is arranged between the planetary gear set 52 and the internal combustion engine 16 when viewed along the viewing direction.

The hybrid drive system 10, in particular the rotor 26, has a rotor wheel 98, which is, in particular, a further gear wheel. In this case, the rotor 26 is coupled via the rotor wheel 98, in particular permanently, in a torque-transmitting manner to the fourth element (second sun gear) 62. A gear wheel 100 corresponding to the rotor wheel 98 is provided that can be connected in a torque-transmitting, in particular rotationally fixed, manner to the fourth element 62. In the first embodiment, however, the gear wheel 100 is connected, in particular permanently, in a rotationally fixed manner to the fourth element 62. Furthermore, the gear wheel 100 meshes, in particular permanently, with the rotor wheel 98, so that the rotor 26 is coupled via the rotor wheel 98 and the gear wheel 100 permanently in a torque-transmitting manner to the fourth element 62. For example, the rotor wheel 98 and the gear wheel 100 are spur gears, so that, for example, the rotor wheel 98 and the gear wheel 100 form a third spur gear stage, in particular provided in addition to the spur gear stages 70 and 86.

In the first embodiment, the switching element 96, for example, is a form-fit switching element, in particular a claw coupling, wherein it can be provided that the remaining, other switching elements 80, 82, 84, 92, and 94 can be friction-fit switching elements, in particular friction couplings and especially disc couplings.

FIG. 2 shows a second embodiment of the hybrid drive system 10. In the second embodiment, the switching elements 80, 82, 84, 92, 94, and 96 are arranged following each other, i.e., one after another, viewed in an axial direction of the respective planetary gear set 50, 52 in the following order: the first switching element 80—the fourth switching element 92—the fifth switching element 94—the sixth switching element 96—the third switching element 84—the second switching element 82. In the second embodiment, the internal combustion engine 16 and the electric machine 22 are arranged on the same side S2 of the first partial gearbox 46, the second side S2 of which is facing away from the first side S in an axial direction of the respective planetary gear set 50, 52 and thus in a direction opposing the viewing direction, i.e., pointing away from the first side S. In the second embodiment, the side S is a side of the planetary gear set 50, and the side S2 is a side of the planetary gear set 52, since in the second embodiment the planetary gear set 50 adjoins the planetary gear set 52, in the viewing direction pointing away from the internal combustion engine 16 and towards the partial gearbox 46, and extending parallel to the planetary gear set rotational axis or coinciding with the planetary gear set rotational axis, so that the planetary gear set 52 is arranged between the planetary gear set 50 and the internal combustion engine 16, viewed in an axial direction.

In the first embodiment, it is provided that the first partial gearbox 46 adjoins the first spur gear stage 70 in the viewing direction and that the second spur gear stage 86 adjoins the first partial gearbox 46 in the viewing direction. In the second embodiment, it is provided that the partial gearbox 46 adjoins the second spur gear stage 86 in the viewing direction and that the first spur gear stage 70 adjoins the partial gearbox 46 in the viewing direction. Furthermore, it is provided in the second embodiment that the switching elements 80 and 92 are each arranged at least partially axially overlapping the electric machine 22.

As in the first embodiment, in the second embodiment the drive shaft 21 is arranged coaxially to the first partial gearbox 46, i.e. to the planetary gear sets 50 and 52. Both in the first embodiment as well as in the second embodiment, the output drive gear wheel 78 is arranged axially between the internal combustion engine 16 and the first partial gearbox 46.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

10 hybrid drive system
12 vehicle wheel
14 vehicle wheel
16 internal combustion engine
18 cylinder housing
20 cylinder
21 drive shaft
22 electric machine
24 stator
26 rotor
28 housing
30 axle drive
32 axle drive housing
34 axle drive input gear
36 arrow
38 pinion gear
40 side gear
42 side shaft
44 gearbox
46 first partial gearbox
48 second partial gearbox
50 first planetary gear set
52 second planetary gear set
54 first element
56 second element
58 third element
60 first planetary gear

62 fourth element
64 fifth element
66 sixth element
68 second planetary gear
70 first spur gear stage
72 output drive shaft
74 first output gear wheel
76 first input gear wheel
78 output drive gear wheel
80 first switching element
82 second switching element
84 third switching element
86 second spur gear stage
88 second output gear wheel
90 second input gear wheel
92 fourth switching element
94 fifth switching element
96 sixth switching element
98 rotor wheel
100 gear wheel
S first side
S2 second side

The invention claimed is:

1. A hybrid drive system for a motor vehicle, the hybrid drive system comprising:

an internal combustion engine having a drive shaft via which first drive torques are suppliable by the internal combustion engine to drive the motor vehicle;

an electric machine having a rotor via which second drive torques are suppliable by the electric machine to drive the motor vehicle;

an axle drive having an axle drive input gear via which the axle drive is drivable;

a gearbox having a first partial gearbox and a second partial gearbox, wherein the first partial gearbox has a first planetary gear set, which has a first element, a second element, and a third element, the first partial gearbox has a second planetary gear set having a fourth element and a fifth element connected permanently in a rotationally fixed manner to the first element and a sixth element, the second partial gearbox has a first spur gear stage, a second spur gear stage, and an output drive shaft, the first spur gear stage has a first output gear wheel, which is arranged coaxially to the output drive shaft and meshes with a first input gear wheel that is connect or is connectable in a rotationally fixed manner to the third element, the second spur gear stage has a second output gear wheel, which is arranged coaxially to the output drive shaft and meshes with a second input gear wheel that is connected or is connectable in a rotationally fixed manner to the sixth element, and the rotor of the electric machine is coupled or couplable to the fourth element in such a way that the respective second drive torque, supplied by the electric machine via the rotor, is introducible at the fourth element into the gearbox;

an output drive gear wheel connected permanently in a rotationally fixed manner to the output drive shaft and meshing permanently with the axle drive input gear of the axle drive;

a first switching element configured to connect the drive shaft of the internal combustion engine in a rotationally fixed manner to the second element; and a second switching element configured to connect the second element in a rotationally fixed manner to the sixth element, wherein the second spur gear stage is arranged on a side of the first partial gearbox facing away from the first spur gear stage when viewed in an axial direction, wherein the sixth switching element is configured to connect the second input gear wheel in a rotationally fixed manner to the fifth element.

2. The hybrid drive system of claim 1, wherein the hybrid drive system includes in total exactly two planetary gear sets, wherein the exactly two planetary gear sets are the first planetary gear set and the second planetary gear set.

3. The hybrid drive system of claim 1, further comprising:

a third switching element configured to connect the sixth element in a rotationally fixed manner to a housing of the hybrid drive system.

4. The hybrid drive system of claim 3, further comprising:

a fourth switching element configured to connect the drive shaft in a rotationally fixed manner to the fourth element.

5. The hybrid drive system of claim 4, further comprising:

a fifth switching element configured to connect the sixth element in a rotationally fixed manner to the second input gear wheel.

6. The hybrid drive system of claim 1, wherein the first input gear wheel is connected permanently in a rotationally fixed manner to the third element.

7. The hybrid drive system of claim 1, wherein a rotor wheel of the electric machine, the second spur gear stage, the first partial gearbox, and the first spur gear stage, when viewed in the axial direction, are arranged one after another in following order: the rotor wheel, the second spur gear stage, the first partial gearbox, and the first spur gear stage.

8. The hybrid drive system of claim 1, wherein the drive shaft is arranged coaxially to the first partial gearbox, wherein the output drive gear wheel is arranged axially between the internal combustion engine and the first partial gearbox.

9. A motor vehicle comprising:

a hybrid drive system, which comprises an internal combustion engine having a drive shaft via which first drive torques are suppliable by the internal combustion engine to drive the motor vehicle;

an electric machine having a rotor via which second drive torques are suppliable by the electric machine to drive the motor vehicle;

an axle drive having an axle drive input gear via which the axle drive is drivable;

a gearbox having a first partial gearbox and a second partial gearbox, wherein the first partial gearbox has a first planetary gear set, which has a first element, a second element, and a third element, the first partial gearbox has a second planetary gear set having a fourth element and a fifth element connected permanently in a rotationally fixed manner to the first element and a sixth element, the second partial gearbox has a first spur gear stage, a second spur gear stage, and an output drive shaft, the first spur gear stage has a first output gear wheel, which is arranged coaxially to the output drive shaft and meshes with a first input gear wheel that is connect or is connectable in a rotationally fixed manner to the third element, the second spur gear stage has a second output gear wheel, which is arranged coaxially to the output drive shaft and meshes with a second input gear wheel that is connected or is connectable in a rotationally fixed manner to the sixth element, and the rotor of the electric machine is coupled or couplable to the fourth element in such a way that the respective second drive torque, supplied by the electric machine via the rotor, is introducible at the fourth element into the gearbox;

an output drive gear wheel connected permanently in a rotationally fixed manner to the output drive shaft and meshing permanently with the axle drive input gear of the axle drive;

a first switching element configured to connect the drive shaft of the internal combustion engine in a rotationally fixed manner to the second element; and a second switching element configured to connect the second element in a rotationally fixed manner to the sixth element, wherein the second spur gear stage is arranged on a side of the first partial gearbox facing away from the first spur gear stage when viewed in an axial direction, and wherein the sixth switching element is configured to connect the second input gear wheel in a rotationally fixed manner to the fifth element.

* * * * *